Feb. 1, 1966  L. E. FISHER  3,233,151
ELECTRICAL PROTECTIVE SYSTEMS
Filed Dec. 31, 1962
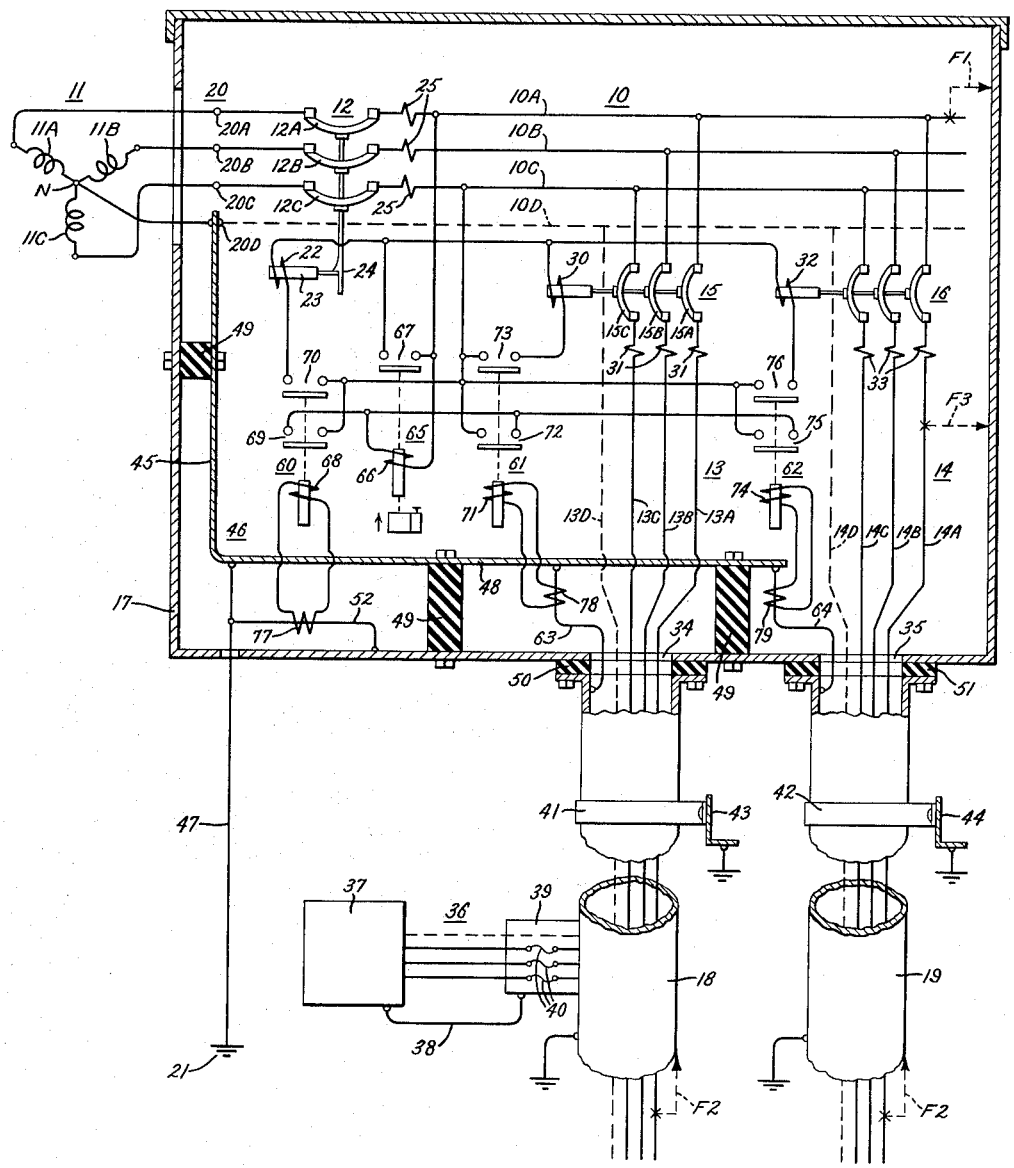
INVENTOR:
LAWRENCE E. FISHER,
BY David M. Schiller
ATTORNEY.

United States Patent Office 3,233,151
Patented Feb. 1, 1966

3,233,151
ELECTRICAL PROTECTIVE SYSTEMS
Lawrence E. Fisher, Southington, Conn., assignor to General Electric Company, a corporation of New York
Filed Dec. 31, 1962, Ser. No. 248,544
8 Claims. (Cl. 317—18)

This invention relates to electrical protective systems and more particularly to fault protective systems for metal enclosed electrical apparatus supplying distribution circuits enclosed in metal conduits.

In electric power distribution systems it is customary to arrange a plurality of interconnected circuit controlling devices and associated circuit components inside one or more sheet metal housings generally referred to as switchboards. Such apparatus provides the requisite means for safely and reliably controlling and protecting a number of different feeder or utilization circuits which emanate from the switchboard and which are supplied from a common source of electrical power. It is general practice to house the respective feeder circuits within grounded metallic conduits which may assume various forms such as busway, race way and armored cable.

Conventional protective schemes for electrical power distribution systems include appropriate equipment for rapidly sensing and individually isolating any short circuit occurring in the respective feeder and branch circuits. Such equipment typically includes main circuit, feeder circuit, and sometimes, branch circuit protective devices. These devices generally are circuit breakers or switches with fuses. In many installations, however, ground faults occur which result in fault currents of insufficient magnitude to directly operate such circuit breakers or switches quickly enough to prevent serious arcing damage. Ground faults which produce low value fault currents occur particularly in low voltage systems (600 volts or less) and in systems wherein high impedance faults are possible.

In many installations ground fault current values are too low to actuate directly instantaneous trip devices of circuit breakers or switches in time to prevent costly damage and resulting shutdown of the installation. Although a circuit breaker will trip ultimately at current values lower than the instantaneous trip setting, the time required for such ultimate tripping is in many cases too great to prevent the low value fault current from damaging equipment. In some installations the instantaneous trip devices of the circuit breakers may be set low, such as six or eight times the circuit breaker ampere rating, so that the circuit breakers will quickly respond to low value fault currents. However, in many installations, such low settings cannot be tolerated inasmuch as they result in nuisance tripping of the circuit breakers when, for example, the installations include large motors which draw high inrush currents during starting. It is therefore desirable to provide separate means for protecting against low value ground fault currents without reliance upon conventional protective devices for this purpose.

In providing ground fault protection in electric distribution systems it is very desirable that provision be made for providing total protection, that is protection for internal ground faults occurring within the switchboard as well as protection for external ground faults occurring in feeder or branch circuits. It is also desirable that provision be made for delaying the operation of the upstream circuit breakers, such as the main and feeder circuit breakers, in response to the occurrence of downstream ground faults. Such delayed operation provides an opportunity for the instantaneous trip devices of downstream circuit breakers to operate in response to the downstream fault, and if these devices do not respond within the delay period, then the upstream circuit breakers will operate in sufficient time to prevent serious damage to equipment.

It is therefore an object of the present invention to provide a novel and improved protective arrangement responsive to ground faults in electric power distribution apparatus for effectively protecting the apparatus from the effects of the fault current.

It is another object of the invention to provide a novel and improved protective arrangement for electric power distribution apparatus responsive to internal ground faults occurring within a metal housing means and responsive to external ground faults occurring in any one of a plurality of feeder or branch circuits for protecting the apparatus against the effects of ground fault current.

It is a further object of the invention to provide a novel and improved protective arrangement as defined in the preceding paragraph including time delay means for delaying operation of upstream circuit protective means a predetermined time after the occurrence of a ground fault.

It is still another object of the invention to provide a novel and improved protective arrangement including separate electroresponsive means responsive respectively to internal ground faults occurring within metal housing means and responsive to external ground faults occurring in any one of a plurality of feeder or branch circuits so that the main circuit breaker cannot be tripped in response to feeder or branch circuit ground faults and the feeder circuit breakers cannot be tripped in response to ground faults within the housing means.

It is a still further object of the invention to provide an arrangement as defined in the preceding paragraph including a single time delay device arranged with respect to the separate electroresponsive means and to the main and feeder circuit breakers so as to delay operation of such circuit breakers a predetermined time after the occurrence of a ground fault.

It is still another object of the invention to provide a novel and improved protective arrangement for protecting electric power distribution apparatus against the effects of low value ground fault currents of insufficient magnitude to operate conventional protective devices.

In carrying out the invention in one form there is provided a protective arrangement which protects against both internal and external ground faults occuring respectively in a metal housing means and in any one of a plurality of feeder or branch circuits outside the housing means. The housing means contains distribution apparatus adapted for energization from a source of multiphase electric power which has one terminal adapted for grounding. The apparatus within the housing means includes main and feeder circuit breakers for controlling and protecting a plurality of feeder circuits emanating from the housing means and contained in separate metal conduits each of which is insulated from the housing means. The protective arrangement of the present invention is particularly suited for protecting against the effects of low value ground fault currents.

In order to protect against ground faults occurring within the metal housing means there is provided first electroconductive means adapted for connection to the one terminal of the power source and to the housing means, and a first electroresponsive device connected to respond to fault current flowing in the first electroconductive means for operating the main circuit breaker. Protection for external faults occurring within any one of the feeder or branch circuits is afforded by means of a plurality of second electroconductive means each adapted for connection to a separate one of the feeder circuit conduits and to the one terminal of the power source, and a plurality of second electroresponsive means each connected to respond to fault currents flowing in a separate one of the second electroconductive means for operating the feeder circuit breakers.

In order to delay operation of the feeder circuit breakers a single time delay device is arranged with respect to the second electroresponsive means and with respect to the trip devices of the feeder circuit breakers so as to delay operation of the feeder circuit breakers a preselected time after occurrence of a fault in any one of the feeder circuits. If time delay in the operation of the main circuit breaker is also desired, the single time delay device is associated with the first electroresponsive means and with the trip device of the main circuit breaker in a manner to delay operation of the main circuit breaker a preselected time after occurrence of a fault within the housing means.

Other objects and advantages of the invention will become apparent from the following description taken in conjunction with the accompanying drawing in which the single figure is a schematic representation of electric power distribution apparatus including means for protecting against both internal and external ground faults.

Referring now to the drawing, the protective arrangement of the present invention is employed with electric distribution apparatus which in general includes an electric power bus 10 adapted to be connected for energization from a multiphase low voltage alternating current source 11 through a multipole main circuit interrupter 12. One or more feeder circuits are connected for energization from the power bus 10, and in the illustrated embodiment two feeder circuits 13 and 14 are connected to the power bus 10 through multipole circuit interrupters 15 and 16 respectively. The feeder circuits 13 and 14 emanate from a metal housing means shown in the form of a main switchboard enclosure 17 and are respectively encased in grounded metallic conduits 18 and 19, the enclosure 17 serving to house the circuit interrupters 12, 15 and 16 and their interconnections. In certain installations the housing means may comprise two separate housings with one housing containing the main interrupter 12 and the other housing spaced from the first housing and containing the feeder interrupters 15 and 16.

More specifically, the power bus 10 includes in the illustrated embodiment three separate phase conductors 10A, 10B and 10C which are connected respectively to power terminals 20A, 20B and 20C of power terminal means 20 through the main circuit interrupter 12. In the illustrated embodiment the power source 11 comprises the secondary of a transformer, the primary of which is not shown, having star-connected secondary windings 11A, 11B and 11C connected respectively to the power terminals 20A, 20B and 20C. The neutral terminal N is connected to a power terminal 20D provided with a ground connection 21 which grounds the entire low voltage power system. In four-wire distribution systems an insulated neutral bus 10D would be connected to terminal 20D, but since this is an optional arrangement, the neutral bus 10D has been illustrated by broken lines. It is understood by those skilled in the art that the distribution apparatus shown could be energized by electric power sources other than the particular source illustrated. For example, the transformer secondary windings could be connected in delta with a midtap of one of the windings being connected to ground.

The main circuit interrupter 12 includes three bridging contacts 12A, 12B and 12C which are mechanically interconnected for movement as a unit to circuit opening and circuit closing positions. The circuit interrupter 12 also includes a shunt trip device including a coil 22 surrounding a magnetic core 23, the coil being effective when energized above a predetermined level to displace the core which releases a latch 24 for opening the circuit breaker 12. The interrupter 12 is equipped with phase overload trip elements 25 included in series with the phase conductors of the power bus 10.

The feeder circuit 13 includes three phase conductors 13A, 13B and 13C, and a neutral conductor 13D if desired, and these phase conductors are connected respectively to the phase conductors 10A, 10B and 10C of the power bus 10. The feeder circuit 13 is energized from the power bus 10 through the feeder circuit interrupter 15 which includes bridging contacts 15A, 15B and 15C each included in a separate one of the feeder phase conductors. The interrupter 15 also includes a shunt trip device including a coil 30 effective when energized above a certain level to open the interrupter 15. Phase overload elements 31 are also associated with the interrupter 15. In a similar manner, the feeder circuit 14 includes phase conductors 14A, 14B and 14C connected to the respective phase conductors of the power bus 10 through the circuit interrupter 16 including contacts 16A, 16B and 16C which are moved as a unit to circuit opening position in response to energization of the coil 32 of the shunt trip device. The interrupter 16 also has associated therewith phase overload devices 33.

The phase conductors of the feeder circuits 13 and 14 extend respectively through openings 34 and 35 of the enclosure 17 and externally of the enclosure 17 the feeder circuit phase conductors are surrounded by the grounded metallic conduits 18 and 19. The feeder circuits so enclosed extend for comparatively long distances to remotely located branch circuits, such as the branch circuit 36 associated with the feeder circuit 13, which energize suitable loads, such as the load 37 associated with branch circuit 36. The load 37 is grounded by a conductor 38 to a housing 39 which contains protective devices such as fuses 40 and which is grounded to the conduit 18. The conduits 18 and 19 may be supported at lengthwise intervals by suitable straps 41 and 42 anchored respectively to structural members 43 and 44.

The conduits 18 and 19, the housing 17 and the neutral terminal 20D are all connected electrically to the station ground which may comprise a water pipe, building steel or the like. In the illustrated embodiment the neutral terminal 20D is connected to station ground through a section 45 of an electroconductive member 46 located within the housing 17, and through a conductor 47 connected to the member 46. The member 46 includes an additional section 48 and the two sections 45 and 48 are supported in electrically insulated relation with respect to the housing 17 by means of insulating spacers 49. The conduits 18 and 19 are also electrically insulated from the housing 17 by means of insulating spacers 50 and 51 positioned between the end flanges of the conduits and the adjacent surface of the housing 17. The housing 17 is connected to the station ground by means of a conductor 52 connected to the housing and to the conductor 47. Preferably, the housing 17 is isolated from ground at all other places.

In accord with the present invention provision is made for protecting the distribution apparatus previously described against both internal and external ground faults. Internal ground faults are those occurring within the housing in either the power bus 10 or the feeder circuits 13 and 14 whereas external faults are those occurring in any one of the feeder circuits 13 and 14 or associated branch circuits. Internal and external ground faults are diagrammatically indicated by the dashed arrows F1 and F2 which represent respectively a faulted connection of the phase conductor 10A of the power bus 10 to the enclosure 17 and faulted connections of the phase conductors 13A and 14A of feeder circuits 13 and 14 to the associated conduits.

To afford protection against internal faults, such as the fault F1, the present invention provides first electroresponsive means 60 coupled to the conductor 52 to respond to fault current flowing in the conductor 52 for effecting energization of the coil 22 of the shunt trip device for the main breaker 12. In order to protect against external faults, such as the ground faults F2, a plurality of second electroresponsive means 61 and 62 are coupled respectively to conductors 63 and 64 which are connected respectively to the conduits 18 and 19 and to the section 48 of the electroconductive member 46. The electroresponsive means 61 and 62 respond to fault current flowing in the conductors 63 and 64 to effect energization of the coils 30 and 32 of the shunt trip devices for the feeder breakers 15 and 16 respectively.

In many installations it is desirable to provide means for introducing a time delay between the occurrence of a ground fault in a downstream circuit and operation of the circuit breakers for the upstream circuits to provide an opportunity for protective devices associated with the faulted downstream circuit to operate in response to the ground fault. Such time delay is preferably of the order of three cycles of the alternating current frequency of the power source which is assumed to be sixty cycles per second. A time delay of this approximate magnitude gives ample opportunity for instantaneously operating protective devices associated with the faulted downstream circuit to operate in response to the ground fault and yet is short enough to prevent serious damage to equipment in the event that such downstream circuit protective devices do not operate. Time delay means may be associated only with the feeder circuit breakers in which event the power bus or main circuit breaker may operate instantaneously, or time delay means may be associated with both the main and feeder circuit breakers as desired. In the illustrated embodiment the time delay means is associated with both the main and feeder circuit breakers and in accordance with the invention a single time delay device is utilized.

The time delay means is represented generally by the numeral 65 and is shown in the form of an electromagnetic relay having an operating winding 66 and normally open contacts 67. The time delay relay 65 may assume a variety of forms as is understood by those skilled in the art. The electroresponsive means 60, 61 and 62 are also illustrated in the form of electromagnetic relays, the relay 60 including an operating winding 68 and two sets of normally open contacts 68 and 70, the relay 61 including an operating winding 71 and two sets of normally open contacts 72 and 73, and the relay 62 similarly including an operating winding 74 and two sets of normally open contacts 75 and 76. The windings 68, 71 and 74 are shown inductively coupled to the conductors 52, 63 and 64 by means of current transformers 77, 78 and 79. It is appreciated however that the current transformers may be omitted and that other coupling arrangements may be employed instead.

The several circuits for controlling energization of the main breakers 12 and the feeder breakers 15 and 16 may now be described. Circuits for controlling energization of the main breaker 12 include a circuit wherein the coil 22 of the trip device for breaker 12 is connected to be energized from the phase conductors 10A and 10C through contacts 70 of the relay 60 and contacts 67 of the time delay relay 65. Further, the coil 66 of time delay relay 65 is connected to be energized from phase conductors 10A and 10C through contacts 69 of the relay 60.

The circuits for controlling energization of the feeder breakers 15 and 16 include a circuit for controlling energization of the breaker 15 wherein the coil 30 of the trip device for breaker 15 is connected to be energized from phase conductors 10A and 10C through contacts 73 of relay 61 and contacts 67 of time delay relay 65. An additional circuit includes the coil 66 of time delay relay 65 which is to be energized from phase conductors 10A and 10C through contacts 72 of relay 61. The coil 32 of feeder breaker 16 is connected to be energized from phase conductors 10A and 10C through contacts 76 of relay 62 and contacts 67 of time delay relay 65. A further circuit includes coil 66 of time delay relay 65 which is to be energized from phase conductors 10A and 10C through contacts 75 of relay 62. It is thus seen that the coil 66 of time delay relay 65 is in series with the parallel connected contacts 69, 72 and 75 of relays 60, 61 and 62, and that the contacts 67 of the time delay relay are in series with three parallel branches including respectively contacts 70 and coil 22 in series, contacts 73 and coil 30 in series and contacts 76 and coil 32 in series.

Operation of the protective arrangement may now be described. Let it be assumed initially that main breaker 12 is in its illustrated circuit closing condition and that power is supplied to the power bus 10 from the source 11. Let it be assumed also that a ground fault F1 occurs within the enclosure 17. For these conditions then fault current will flow from the faulted phase conductor 10A through the conductive material of enclosure 17, conductor 52, a portion of conductor 4, section 45 of the conductive member 46, and through the neutral terminal N back to the phase conductor 10A. The coil 68 of relay 60 will be energized in response to the above described flow of fault current and will effect closure of contacts 69 and 70. When contacts 69 are closed the energizing circuit for coil 66 of time delay relay 65 is completed and this coil is energized to effect closure of contacts 67 after a predetermined time delay. When contacts 67 close, coil 22 is energized to effect operation of main circuit breaker 12 to its circuit interrupting position to thereby deenergize power circuit 10. If desired, circuit breaker 12 may be disassociated from time delay relay 65 to be operated instantaneously in response to energization of relay 60. It is thus seen that the breaker 12 is operated in response to low value fault currents insufficient to directly operate the breaker.

A delay of the order of three cycles in operation of the main breaker 12 afforded by the relay 65 is desirable in that it provides an opportunity for instantaneously operatable feeder breakers of switches to operate in the event that the internal fault within the enclosure results from the grounding of one of the feeder circuit phase conductors to the enclosure as represented by the dash lines F3. If the delay is not provided, the main breaker 12 might be tripped unnecessarily for such a ground fault which in many cases could be cleared almost instantly by operation of the feeder breaker. The time delay should be selected to be sufficiently long to permit operation of downstream breakers or switches, and sufficiently short to minimize damage by ground fault current in the event that downstream breakers or switches do not operate.

Let it be assumed now that an external fault occurs in either a feeder circuit or a branch circuit connected thereto, such as the fault F2 in the feeder circuit 13. In this case fault current will flow from the feeder phase conductor 13A through the metal conduit 18, the conductor 63, the member 45, the neutral N and through the phase conductor 10A back to the faulted phase conductor 13A. This fault current flow will effect energization of coil 71 of relay 61 with resultant closure of contacts 72 and 73. Closure of contacts 72 effects energization of coil 66 of time delay relay 65 with resultant closure of contacts 67 after a predetermined time delay. When contacts 67 close, the coil 30 of the trip device for feeder breaker 15 is energized to effect operation of breaker 15 to deenergize feeder circuit 13 and its associated branch circuit 36. The time delay provides an opportunity for instantaneously operatable downstream protective devices, such as the branch circuit fuses, 40, to operate in the event that the external ground fault is in a branch circuit, such as the circuit 36, rather than in the feeder circuit 13 as shown.

While I have shown and described a particular embodiment of my invention, it will be obvious to those skilled in the art that various changes and modifications may be made without departing from my invention in its broader aspects and I, therefore, intend in the appended

What I claim as new and desire to secure by Letters Patent of the United States is:

1. A ground fault protective system for alternating current electric power apparatus comprising, a main multipole circuit interrupter adapted for connection to a polyphase power source having a grounded terminal, a feeder multipole circuit interrupter connected to said main interrupter, metal housing means for housing said main and feeder circuit interrupters, a feeder circuit emanating from said housing means and connected to said feeder circuit interrupter, a metal conduit surrounding said feeder circuit outside said housing means and insulated from said housing means, first electroconductive means adapted for connection to said conduit and to the grounded terminal and insulated from said housing means, second electroconductive means adapted for connection between said housing means and the grounded terminal, first electroresponsive means responsive to fault current in said first electroconductive means connected for operating said feeder circuit interrupter, and second electroresponsive means responsive to fault current in said second electroconductive means connected for operating said main circuit interrupter.

2. A ground fault protective system for alternating current electric power apparatus comprising, a main multipole circuit interrupter adapted for connection to a polyphase power source having a grounded terminal, a feeder multipole circuit interrupter connected to said main interrupter, metal housing means for housing said main and feeder circuit interrupters, a feeder circuit emanating from said housing means and connected to said feeder circuit interrupter, a metal conduit surrounding said feeder circuit outside said housing means and insulated from said housing means, first electroconductive means adapted for connection to said conduit and to the grounded terminal and insulated from said housing means, second electroconductive means adapted for connection between said housing means and the grounded terminal, first electroresponsive means responsive to fault current in said first electroconductive means connected for operating said feeder circuit interrupter, second electroresponsive means responsive to fault current in said second electroconductive means connected for operating said main circuit interrupter, and time delay means connected to said first electroresponsive means to delay operation of said feeder circuit interrupter a predetermined time after response of said first electroresponsive means.

3. A ground fault protective system for alternating current electric power apparatus comprising, a main multipole circuit interrupter adapted for connection to a polyphase power source having a grounded terminal, a feeder multipole circuit interrupter connected to said main interrupter, a metal housing means for housing said main and feeder circuit interrupters, a feeder circuit emanating from said housing means and connected to said feeder circuit interrupter, a metal conduit surrounding said feeder circuit outside said housing means and insulated from said housing means, first electroconductive means adapted for connection to said conduit and to the grounded terminal and insulated from said housing means, second electroconductive means adapted for connection between said housing means and the gronuded terminal, first electroresponsive means responsive to fault current in said first electroconductive means connected for operating said feeder circuit interrupter, second electroresponsive means responsive to fault current in said second electroconductive means connected for operating said main circuit interrupter, a time delay relay having a coil and a pair of normally open contacts to be closed in response to energization of said coil, each of said feeder and main circuit interrupters including a separate operating coil, each of said first and second electroresponsive means including two sets of normally open contacts, first circuit means connecting the coil of said time delay relay in series with parallel connected first sets of contacts of said first and second electroresponsive means, and second circuit means connecting the contacts of said time delay relay in series with parallel connected branches including respectively the operating coil of said main circuit interrupter and the second set of contacts of said second electroresponsive means in series and the operating coil of said feeder circuit interrupter and the second set of contacts of said first electroresponsive means in series.

4. A ground fault protective system for alternating current electric power apparatus comprising: a main multipole circuit interrupter adapted to be connected to a polyphase source of electric power, said source having a grounded terminal, a plurality of multipole feeder circuit interrupters connected to said main circuit interrupter, metal housing means for housing all of said circuit interrupters, a plurality of multiwire feeder circuits emanating from said housing means and connected therein to said feeder circuit interrupters respectively, a plurality of metal conduits respectively embracing said feeder circuits outside said housing means and insulated from said housing means, separate first conducting means adapted to be connected between each of said conduits and the grounded terminal of said source, said first conducting means being electrically insulated from said housing means, second conducting means adapted to be connected between said housing means and the grounded terminal of said source, a plurality of first electroresponsive means each coupled to a separate one of said first conducting means responsive to fault current in the associated first conducting means for operating the associated one of said feeder circuit interrupters and second electroresponsive means coupled to said second conducting means responsive to fault current in said second conducting means for operating said main circuit interrupter.

5. A ground fault protective system for alternating current electric power apparatus comprising: a main multipole circuit interrupter adapted to be connected to a polyphase source of electric power, said source having a grounded terminal, a plurality of multipole feeder circuit interrupters connected to said main circuit interrupter, metal housing means for housing all of said circuit interrupters, a plurality of multiwire feeder circuits emanating from said housing means and connected therein to said feeder circuit interrupters respectively, a plurality of metal conduits respectively embracing said feeder circuits outside said housing means and insulated from said housing means, separate first conducting means adapted to be connected between each of said conduits and the grounded terminal of said source, said first conducting means being electrically insulated from said housing means, second conducting means adapted to be connected between said housing means and the grounded terminal of said source, a plurality of first electroresponsive means each coupled to a separate one of said first conducting means responsive to fault current in the associated first conducting means for operating the associated one of said feeder circuit interrupters, second electroresponsive means coupled to said second conducting means responsive to fault current in said second conducting means for operating said main circuit interrupter, and a time delay relay operatively connected to each of said feeder circuit interrupters and to each of said first electroresponsive means for delaying operation of said feeder circuit interrupters a predetermined time after any one of said first electroresponsive means responds to fault current in the associated first electroconductive means.

6. A ground fault protective system for alternating current electric power apparatus comprising: a main multipole circuit interrupter adapted to be connected to a polyphase source of electric power, said source having a grounded terminal, a plurality of multipole feeder circuit interrupters connected to said main circuit interrupter, metal housing means for housing all of said circuit interrupters, a plurality of multiwire feeder circuits emanating from said housing means and connected therein to said feeder circuit interrupters respectively, a plurality of metal conduits respectively embracing said feeder circuits outside said housing means and insulated from said housing means, separate first conducting means adapted to be connected between each of said conduits and the grounded terminal of said source, said first conducting means being electrically insulated from said housing means, second conducting means adapted to be connected between said structure and the grounded terminal of said source, a plurality of first electroresponsive means each coupled to a separate one of said first conducting means responsive to fault current in the associated first conducting means for operating the associated one of said feeder circuit interrupters, second electroresponsive means coupled to said second conducting means responsive to fault current in said second conducting means for operating said main circuit interruper, and a time delay relay having a coil and a pair of normally open contacts to be closed in response to energization of said coil, each of said feeder and main circuit interrupters including a separate operating coil, each of said first and second electroresponsive means including two sets of normally open contacts, first circuit means connecting the coil of said time delay relay in series with parallel connected first sets of contacts of said first and second electroresponsive means, second circuit means connecting the contacts of said time delay relay in series with parallel connected branches including a first branch consisting of the operating coil of said main circuit interrupter and the second set of contacts of said second electroresponsive means in series, and a plurality of second branches in parallel with the first branch, each second branch including the operating coil of a separate feeder circuit interrupter and the second set of contacts of the associated first electroresponsive means in series.

7. A ground fault protective system for alternating current electric power apparatus comprising: a main multipole circuit interrupter adapted to be connected to a polyphase source of electric power, said source having a grounded terminal, a plurality of multipole feeder circuit interrupters connected to said main circuit interrupter, metal housing means for housing all of said circuit interrupters, a plurality of multiwire feeder circuits emanating from said housing means and connected therein to said feeder circuit interrupters respectively, a plurality of metal conduits respectively embracing said feeder circuits outside said housing means and insulated from said housing means, a conductive member insulated from said housing means and adapted for connection to the grounded terminal of said source, a plurality of conductors each connected between said conductive member and a separate one of said conduits, each of said conductors being insulated from said housing means, and a plurality of electroresponsive means each responsive to fault current in a separate one of said conductors for operating a separate one of said feeder circuit interrupters.

8. A ground fault protective system for alternating current electric power apparatus comprising: a main multipole circuit interrupter adapted to be connected to a polyphase source of electric power, said source having a grounded terminal, a plurality of multipole feeder circuit interrupters connected to said main circuit interrupter, metal housing means for housing all of said circuit interrupters, a plurality of multiwire feeder circuits emanating from said housing means and connected therein to said feeder circuit interrupters respectively, a plurality of metal conduits respectively embracing said feeder circuits outside said housing means and insulated from said housing means, a conductive member insulated from said housing means and adapted for connection to the grounded terminal of said source, a plurality of conductors each connected between said conductive member and a separate one of said conduits, each of said conductors being insulated from said housing means, a plurality of electroresponsive means each responsive to fault current in a separate one of said conductors for operating a separate one of said feeder circuit interrupters, electroconductive means connected between said conductive member and said housing means, and additional electroresponsive means responsive to fault current in said electroconductive means for operating said main circuit interrupter, and a single time delay relay operatively connected to each of said electroresponsive means and to each of said circuit interrupters to delay operation of said circuit interrupters a predetermined time after response of any of said electroresponsive means.

References Cited by the Examiner
UNITED STATES PATENTS

| 3,113,244 | 12/1963 | Kurt | 317—18 |
| 3,113,245 | 12/1963 | Hoffmann | 317—18 |

SAMUEL BERNSTEIN, *Primary Examiner.*